United States Patent [19]

Antony et al.

[11] Patent Number: 5,467,847
[45] Date of Patent: Nov. 21, 1995

[54] DISC BRAKE

[75] Inventors: Paul Antony, Worms; Wolfgang Falter, Heidelberg; Andreas Kiessig, Leizig; Matthias Berg, Schriesheim, all of Germany

[73] Assignee: Perrot Bremsen GmbH, Mannheim, Germany

[21] Appl. No.: 299,107

[22] Filed: Sep. 2, 1994

[30] Foreign Application Priority Data

Sep. 2, 1993 [DE] Germany .......................... 43 29 675.0
Dec. 21, 1993 [DE] Germany .......................... 43 43 737.0

[51] Int. Cl.$^6$ ................................................. F16D 55/18
[52] U.S. Cl. ................................. 188/73.39; 188/73.43
[58] Field of Search ............................. 188/71.7, 72.4, 188/72.7, 73.39, 73.41, 340

[56] References Cited

U.S. PATENT DOCUMENTS

| | | | |
|---|---|---|---|
| 3,990,545 | 11/1976 | Hoffman et al. ................... | 188/73.39 |
| 4,321,984 | 3/1982 | Burgdorf et al. .................. | 188/73.39 |
| 4,335,806 | 6/1982 | Lupertz ............................ | 188/73.39 |
| 4,632,227 | 12/1986 | Mery et al. ....................... | 188/73.39 |
| 4,823,920 | 4/1989 | Evans ............................... | 188/73.39 |
| 5,188,202 | 2/1993 | Terashima ......................... | 188/73.39 |

FOREIGN PATENT DOCUMENTS

| | | | |
|---|---|---|---|
| 2326047 | 12/1973 | Germany . | |
| 2750337 | 5/1979 | Germany . | |
| 2919548 | 2/1980 | Germany . | |
| 0062923 | 3/1988 | Japan ............................... | 188/73.39 |

*Primary Examiner*—Robert J. Oberleitner
*Assistant Examiner*—Chris Schwartz
*Attorney, Agent, or Firm*—Jacobson, Price, Holman & Stern

[57] ABSTRACT

A sliding-caliper disc brake is described. To avoid inclined nonuniform tangential wear of the brake pads, each of the two brake shoes is "de-coupled" from the brake caliper and/or from a pressure plate disposed on the actuation-side ("B-side"), of the brake disc. The brake shoes are braced against a brake bracket only on the outgoing side ("A side") of the brake disc, whereas the caliper is braced against the brake bracket only on the incoming side ("E side") of the brake disc. Therefore the caliper counters deformation of the brake and thereby reduces inclined nonuniform tangential wear of the brake pad associated with such deformation.

14 Claims, 6 Drawing Sheets

$F_r$ = Reibkraft zwischen den Stützflächen
$F_u$ = Umfangskraft
+/−= Anschlagspiel

DISC BRAKE

BACKGROUND OF THE INVENTION

This invention relates to a disc brake, of the kind comprising a brake bracket, a brake disc, an actuation-side ("B-side") brake shoe, an outer-rim-side ("F-side") brake shoe, a brake caliper axially slidably held on the brake bracket, in particular so as to be axially slidable with respect to the brake disc, and which has an outer-rim-side (F-side) caliper arm which extends over the brake disc, a configuration for preventing the F-side brake shoe from rotating along with the brake disc, wherewith by means of said configuration the F-side brake shoe is braced against the brake bracket, a configuration for preventing the B-side brake shoe from rotating along with the brake disc, wherewith by means of said configuration the B-side brake shoe is braced against the brake bracket, and a configuration for preventing the F-side caliper arm from rotating along with the brake disc, wherewith by means of said configuration the [F-side] caliper arm is braced against the brake bracket.

If such a disc brake is actuated while the brake disc is rotating in a given direction, the brake caliper on the F-side tends to move (along with the brake pad) in the direction of the outgoing side ("A-side") of the brake disc, in consequence of the tangential braking force which is being applied and the resulting deformation of the brake bracket; and the brake pad becomes braced against the brake bracket. This movement is accompanied by an inclination of the caliper whereby the brake shoe becomes loaded more heavily on the outgoing side ("A side"), may result in tangential wear of the brake pad of an inclined nature. Further, the inclined orientation of the caliper results in forces, in particular, countertorques, which act on the holding means which hold the caliper on the brake bracket, whereby a risk of jamming arises. On the actuating side ("B side"), the brake bracket tends to be rotated around the configuration by which the brake head is braced on the A side, whereby here inclined tangential wear of the brake pad tends to develop on the incoming side ("E side").

Ger. Pat. 2,919,548 C2 discloses (FIGS. 1 and 6 thereof) an F-side bracing configuration for the brake caliper and the brake shoes with respect to the brake bracket. The bracing therefrom occurs generally on the A side, both for the brake shoes and for the brake caliper. Consequently, all of the tangential braking forces act on one side as to their action on the bracket arm, and thereby they produce a deforming effect on said arm. As a result, inclinations of the caliper unavoidably occur with respect to the F-side brake pad [i.e. with respect to the brake disc on the F side] and with respect to the bolt guide means which hold the caliper.

In the sliding-caliper disc brake according to Ger. OS 23 26 047, means of holding the brake caliper on the brake bracket are provided in the form of bolt guide means, which serve to receive the tangential braking forces which are produced. These bolt guide means extend axially over and beyond the extent of the brake disc. With this structure, there is a risk that the bolts themselves will deform, and thereby the axial slidability of the caliper will be detrimentally affected.

Ger. Pat. 2,750,337 C2 discloses a partial-pad disc brake wherein the means of tangentially and radially guiding the caliper are in the form of "prism guide means" which extend axially over and beyond the brake rotor disc. With prism guide means, very low dimensional tolerances must be met in order to avoid jamming. The F-side brake shoe is attached to the F-side caliper arm, and is braced against the brake caliper guide means (prism guide means) mounted on the brake bracket on the A side. According to Claim 1 of this reference, the caliper arm "positively" and form-interlockingly engages the brake bracket on the E side. According to the stated underlying problem of the invention of this reference, to effectively enhance rigidity this is supposed to divide the F-side tangential forces on the brake head into halves, such that said forces are simultaneously transmitted essentially equally to the E side and A side of the brake bracket. However, in practice this solution is unsatisfactory, because it is essentially impossible to achieve the intended uniform distribution of forces, due to manufacturing tolerances. Bracing of a caliper arm tends to occur only on the E side or else only on the A side, and consequently an inclined orientation of the caliper along with inclined tangential wear of the brake pad can occur.

SUMMARY OF THE INVENTION

An object of the present invention is to provide a disc brake of the type described which minimizes inclined wear of the brake pads.

According to the invention, the F-side brake shoe and the F-side caliper arm are slidable with respect to each other in a plane parallel to the brake disc, and the rotation protection configuration for the F-side brake shoe only braces the F-side brake shoe against the brake bracket on the A side of the brake bracket, whereas the rotation protection configuration for the F-side caliper arm only braces the F-side caliper arm against the brake bracket on the E side of the brake bracket.

The invention stems from the surprisingly simple discovery that effective distribution of the tangential braking forces acting on the brake shoe and on the brake caliper, such that the forces are essentially evenly distributed between the E side and A side is reliably achieved only if the brake shoe and brake caliper are "de-coupled" with respect to each other and are braced against the brake bracket only on the appropriate side of the brake bracket. This distribution of the tangential braking forces onto the two sides of the brake bracket (E side and A side) reliably avoids inclined orientations and deformations of the caliper and the bracket which lead to inclined wear of the brake pad.

According to a preferred embodiment of the invention, the rotation protection configuration for the B-side brake shoe only braces the B-side brake shoe against the A side of the brake bracket, a prerequisite for this is that the actuating mechanism disposed between the brake caliper and the B-side brake shoe must sufficiently "de-couple" the brake caliper and the B-side brake shoe in the sense of producing opposite rotations in a plane parallel to the brake disc. This prerequisite is likely to be satisfied; but if not, a suitable additional means of de-coupling may be provided.

According to another preferred embodiment of the invention, a pressure plate is provided which serves to press the B-side brake shoe against the brake disc, wherewith a rotation prevention configuration is provided to prevent the pressure plate from rotating along with the brake disc, which configuration serves to brace the pressure plate against the brake bracket, but only does so on the E side of the brake bracket. In this case, too, therefore, there is a distribution of forces: the tangential braking forces acting on the pressure plate are received on the E side of the brake bracket, whereas the tangential braking forces acting on the B-side brake shoe are received on the A side of the brake bracket.

It is preferred for the pressure plate to be slidable with respect to the B-side brake shoe in a plane parallel to the brake disc. This makes it possible for the tangential braking forces acting on the pressure plate to be received by the brake bracket on the E side of the brake bracket, whereas the tangential braking forces acting on the B-side brake shoe are received by the brake bracket on the A side of the brake bracket.

Alternatively, it may be provided that the pressure plate and the B-side brake shoe are not slidable with respect to each other in a plane parallel to the brake disc.

The inventive principle of providing different abutment of the F-side brake shoe and the F-side caliper arm can also be applied to a brake shoe which is pressed against a brake disc by a pressure plate.

Thus the invention is also applicable to a disc brake comprised of a brake bracket, a brake disc, a brake shoe, a configuration for preventing the brake shoe from rotating along with the brake disc, wherewith by means of said configuration the brake shoe is braced against the brake bracket, and a pressure plate for pressing the brake shoe against the brake disc.

According to the invention it is provided that the brake shoe and pressure plate are slidable with respect to each other in a plane parallel to the brake disc, and a rotation protection configuration is provided for the brake shoe which configuration only braces the pressure plate against the brake bracket on the A side of the brake bracket, whereas the rotation protection configuration for the pressure plate only braces the pressure plate against the brake bracket on the E side of the brake bracket.

According to a particularly preferred embodiment of the invention, a rotation protection configuration for an F-side brake shoe is provided which braces the F-side brake shoe against the brake bracket only on the A side of the brake bracket. In this case as well, a prerequisite is that the F-side brake shoe be suitably "de-coupled" from the brake caliper.

It is further preferred that at least one support surface of the rotation protection configuration for the pressure plate and/or for the B-side brake shoe be at least in part oriented at an incline to the brake disc, and thereby be inclined counter to a preferred rotation direction. This creates a kind of overrunning ramp, whereby, when the pressure plate and/or the B-side brake shoe is/are translated in the axial direction with respect to the brake disc, a tangential countertorque is produced in the rotation protection configuration. This brings about better force distribution in the sense of distribution of the pressing force of the brake pad against the brake disc, between the E side and the A side, and thereby further reduces tangential wear of the brake pad.

The support surfaces may have different forms. According to one embodiment, one or more of these surfaces may be convexly rounded.

When the brake is actuated, the two brake shoes, the caliper, and possibly the pressure plate, if a pressure plate is present, are slid axially toward the brake disc. It is desired that the bracing of these elements against the brake bracket by the respective bracing configurations not interfere with this slidability. In order to avoid such interference, according to the invention it may be provided that the rotation protection configuration(s) for the F-side brake shoe, The B-side brake shoe, the F-side caliper arm, and/or the pressure plate have a detent gap. This detent gap ensures that the respective element(s) will be able to slide readily in the axial direction with respect to the brake bracket at least until the tangential braking force is applied, i.e. until the brake pad is pressed against the brake disc.

The magnitude of the relevant deformation of the brake bracket in consequence of the tangential braking forces which it accepts depends on the length of the moment arm with respect to the brake disc axis. This is also true of the deformation of the means by which the brake caliper is axially slidably held on the brake bracket. In this connection, according to the invention it is preferred that the rotation protection configuration(s) for the F-side brake shoe, the B-side brake shoe, the F-side caliper arm, and/or the pressure plate be disposed such that the moment arm of the bracing force of said element(s) against the brake bracket, with respect to the rotational axis of the brake disc, be as short as possible.

According to a preferred embodiment, the rotation protection configuration for the F-side caliper arm is disposed in a recess in said F-side caliper arm, the extent of which recess in the axial direction with respect to the brake disc allows a suitable sliding excursion of the brake caliper when the brake is actuated. "Recess" here refers to a pocket-like depression, rather than a penetrating opening. In this way the rigidity of the brake caliper at the relevant locations is not substantially decreased.

In order to avoid stress concentration effects in connection with the recess feature, according to the invention, the boundaries of the recess are provided with rounded corners or the like.

Finally, according to the invention, guide means in bolt or rod form may be provided for slidably holding the brake caliper on the brake bracket.

The invention will be described in more detail hereinbelow, based on a preferred embodiment, with reference to the drawings, which disclose additional features.

BRIEF DESCRIPTION OF THE DRAWINGS

FIG. 3b is a plan view of a detail of FIG. 3a; and

DESCRIPTION OF THE PREFERRED EMBODIMENTS

Figure 1:
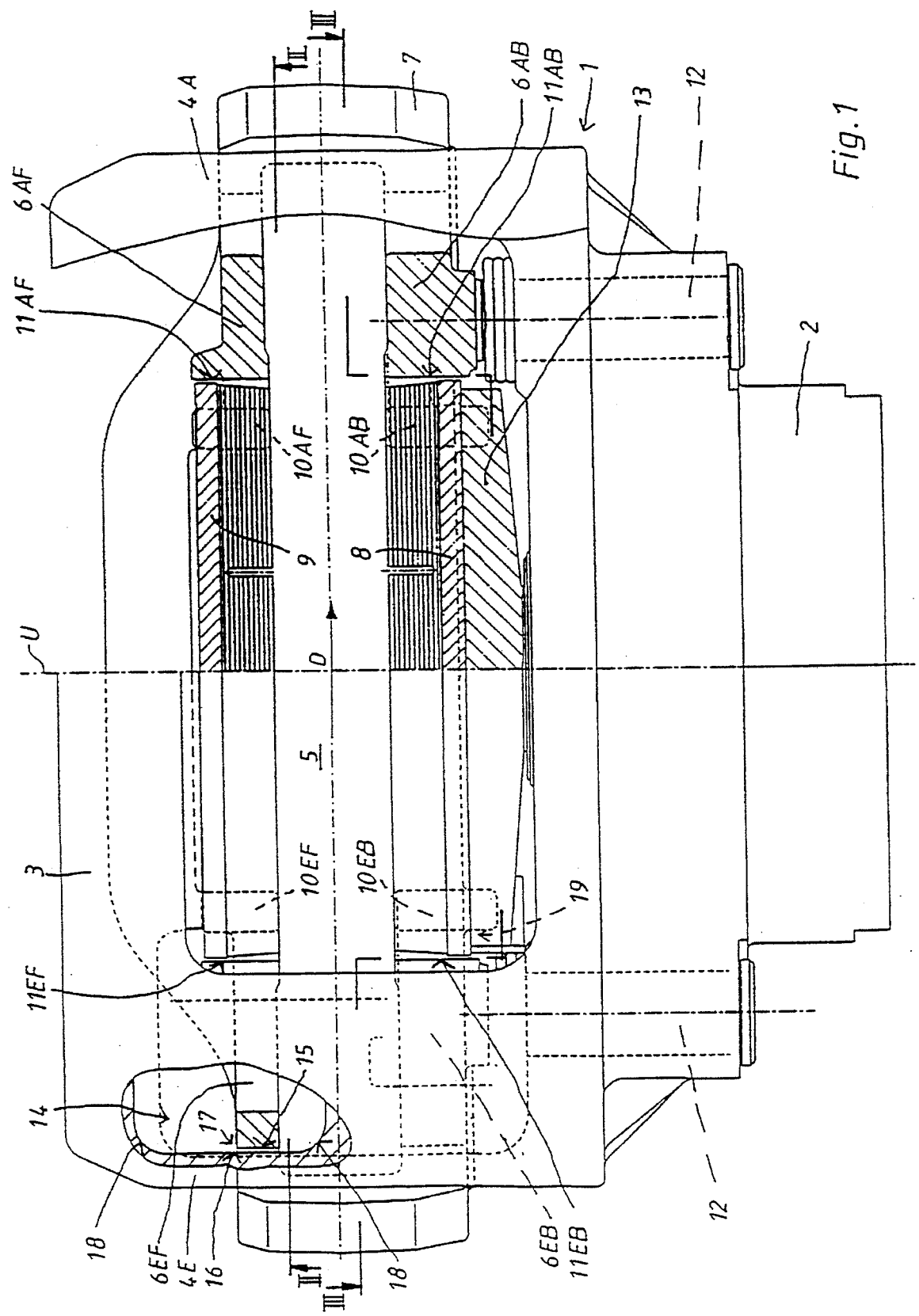
FIG. 1 is a plan view, in partial cross section, of a sliding caliper disc brake according to an exemplary embodiment of the invention.
Figure 2:
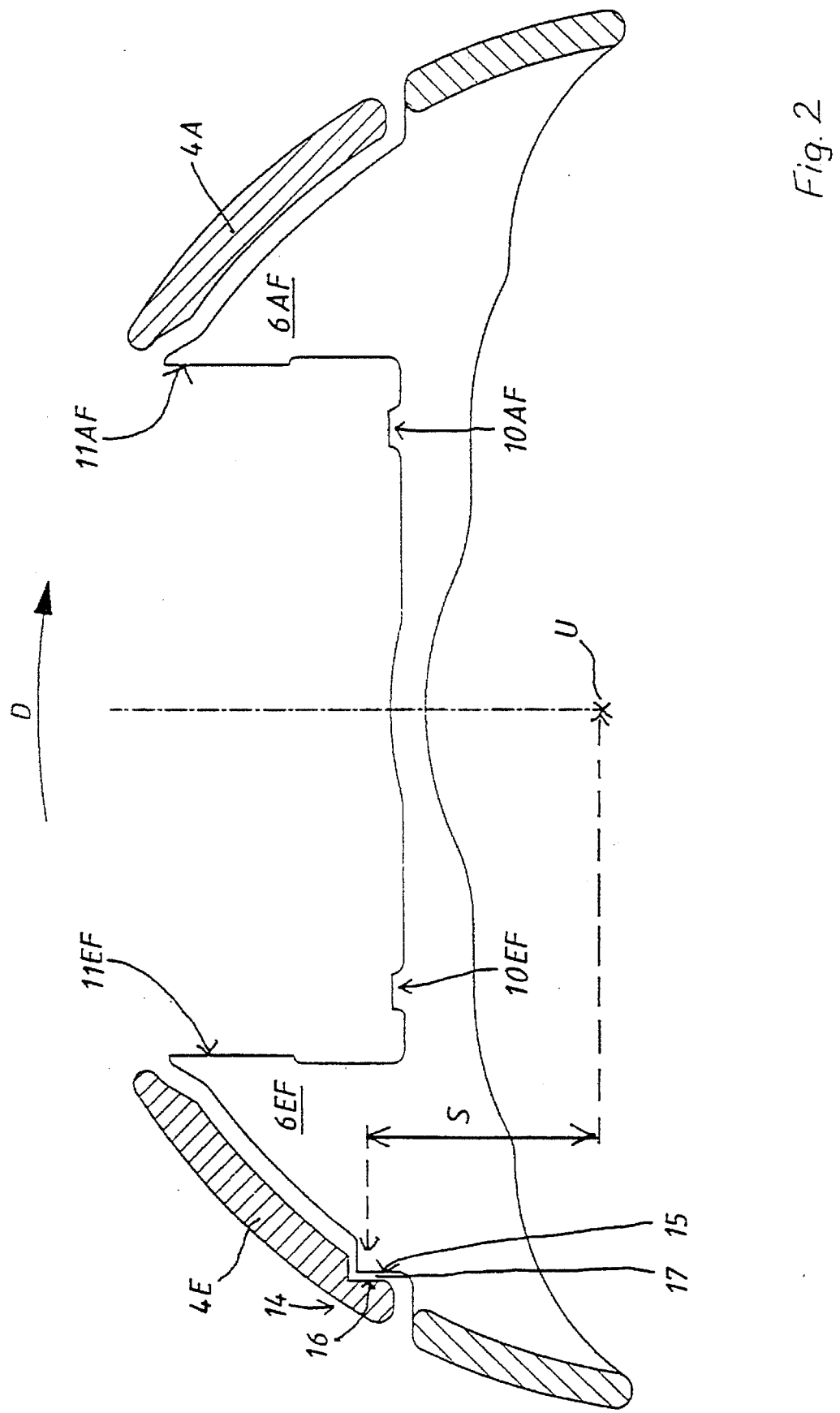
FIG. 2 is a cross section along line II—II of FIG. 1, toward the outside rim of the wheel (the F side), but with the brake shoe eliminated for purposes of clarity.
Figure 3:
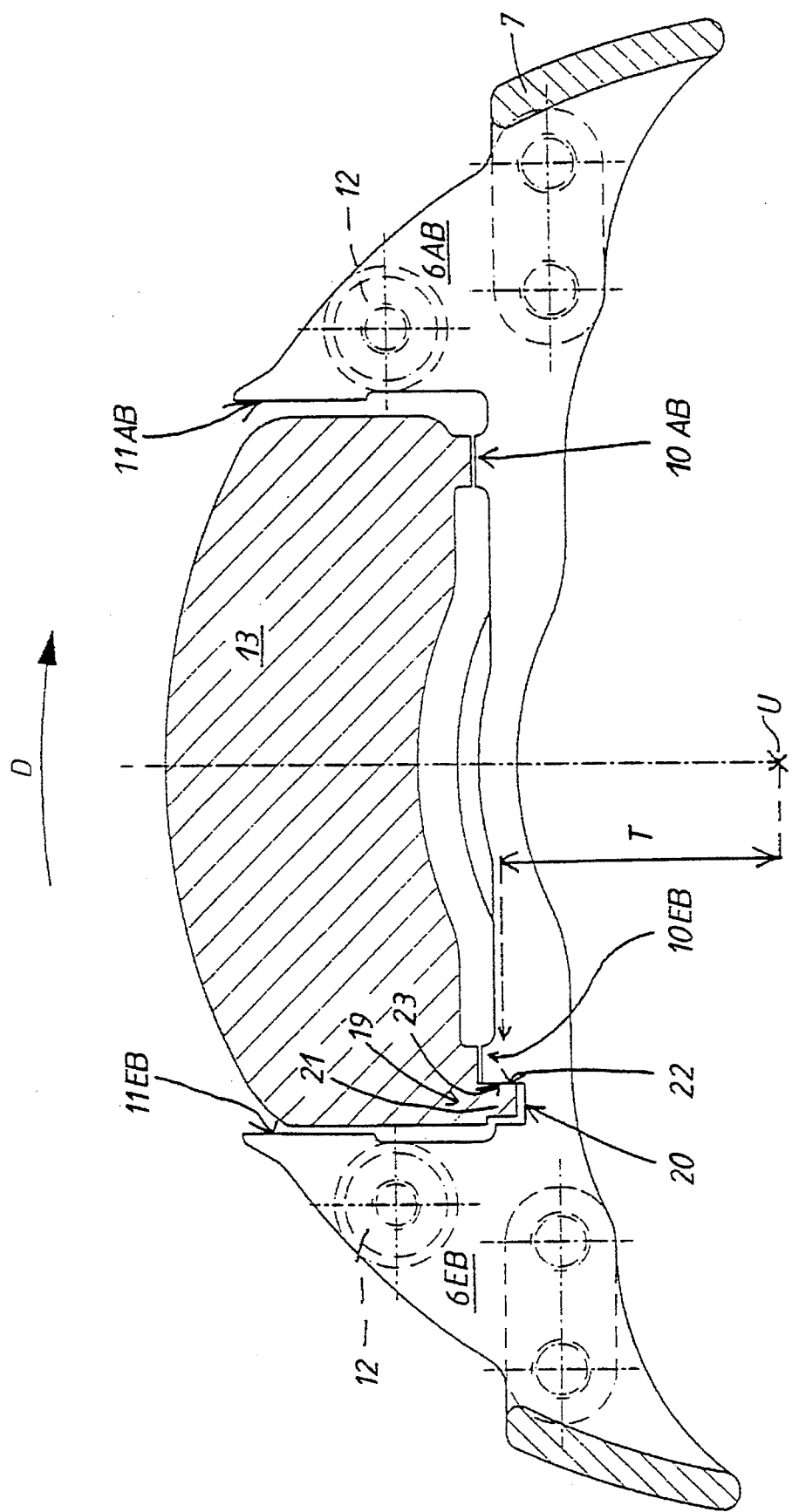
FIG. 3 is a cross section along line III—III of FIG. 1 toward the actuating side (the B side), again with the brake shoe eliminated.

FIGS. 1–3 show a sliding caliper disc brake. For simplicity, elements which appear a plurality of times in the brake have reference numerals to which letter suffixes are assigned. In this connection, as to the four principal directions, A represents the outgoing side ("A side") of the brake disc in its rotational direction;

E represents the incoming side ("E side") of the brake disc;

B represents the actuation side ("B side") of the brake; and

F represents the outer wheel rim side ("F side") of the brake.

The designations of A and E are based on a preferred disc rotational direction D, on the basis of which the structure of the brake will be described hereinbelow.

The brake has a caliper 1, a caliper arm 2 on the actuating side (B side), and a second caliper arm 3 on the outer rim side (F side). The two caliper arms (2, 3) have caliper bridge elements (4E, 4A) which extend over bracket arms (6EB, 6EF, 6AB, 6AF) of a brake bracket 7 to be fixed to a vehicle, which arms are disposed on opposite sides of brake disc 5. The brake bracket 7 has a frame configuration. Inside the brake bracket 7, brake shoes (8, 9) are guided, generally axially, on radially inwardly disposed bearing ridges (10EB, 10EF, 10AB, 10AF), and are supported laterally with respect to the direction of rotation of the disc by bearing ridges (11AB and 11AF, as well as 11EB and 11EF) on the brake bracket 7.

The caliper 1 is axially slidably mounted on bolts 12, which extend generally in the direction of the axis of the brake disc 5 on the B side, so as to be slidable along a brake axis U with respect to the locationally fixed brake bracket 7. Other means for holding or guiding the caliper may be employed instead of the guide bolts. A pressure plate 13 is axially slidably disposed between the brake actuating mechanism (not shown) and the B-side brake shoe 8. Depending on the brake type, the pressure plate may be dispensed with.

In order to avoid an inclined orientation of the caliper, the brake has a bracing region 14 which is formed at the FE-location, between the F-side caliper arm 3 and the bracket arm 6EF, at a relatively short torque arm distance S from the brake axis U (see FIG. 2). More precisely, the bracing region 14 is disposed in the region of the F-side caliper arm 3 attributable to the caliper bridge 4E. The bracing region 14 defines the above-mentioned rotation protection configuration for the F-side caliper arm 3.

In this connection, a support surface 15 is provided on bracket arm 6EF, and a second support surface 16 is provided on caliper bridge 4E, facing surface 15. The support surfaces (15, 16) are separated from each other by a detent gap 17. This gap is important for easy operability of the brake, and will be discussed in further detail below. The axial length of the support surface 16 enables the caliper to be adjusted as brake pad wear occurs. The support surface 16 represents the bottom of a recess which recess extends over a part of the caliper bridge 4 and has rounded corners 18. The caliper arm 3 does not have axial openings which penetrate through it to the F-side; the absence of such openings preserving its rigidity. The rounded corners 18 enable avoidance of corner stress concentration, which stress concentration would be undesirable.

As shown in FIG. 3, a rotation prevention configuration 19 is provided to prevent rotation of the pressure plate 13 with the brake disc 5. Rotation prevention configuration 19 is active between the pressure plate 13 and the inner bearing ridge 10EB of the brake bracket 7, on the E-side at a relatively short moment arm distance T from the brake axis U. In this connection, the brake bracket 7 has a recess 20 engaged by a dog 21 on the pressure plate 13. The elements 20 and 21 may be reversed, wherewith the recess is on the pressure plate 13 and the dog is on the brake bracket 7. The support surfaces are surface 22 and surface 23, respectively. A lateral detent gap may be present between the support surfaces.

Figure 3A:
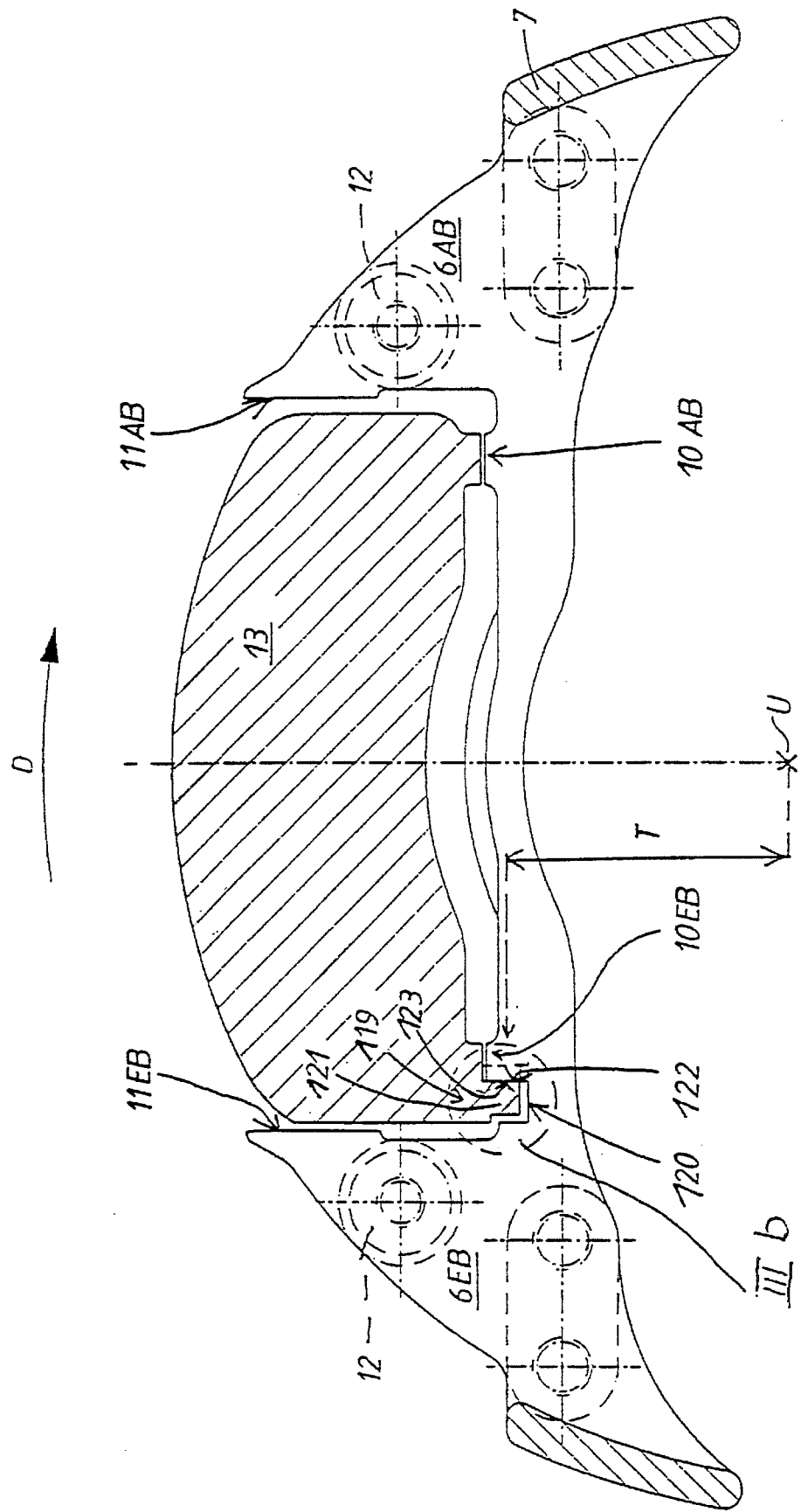
FIG. 3a is an alternative embodiment to that of FIG. 3.
Figure 3B:
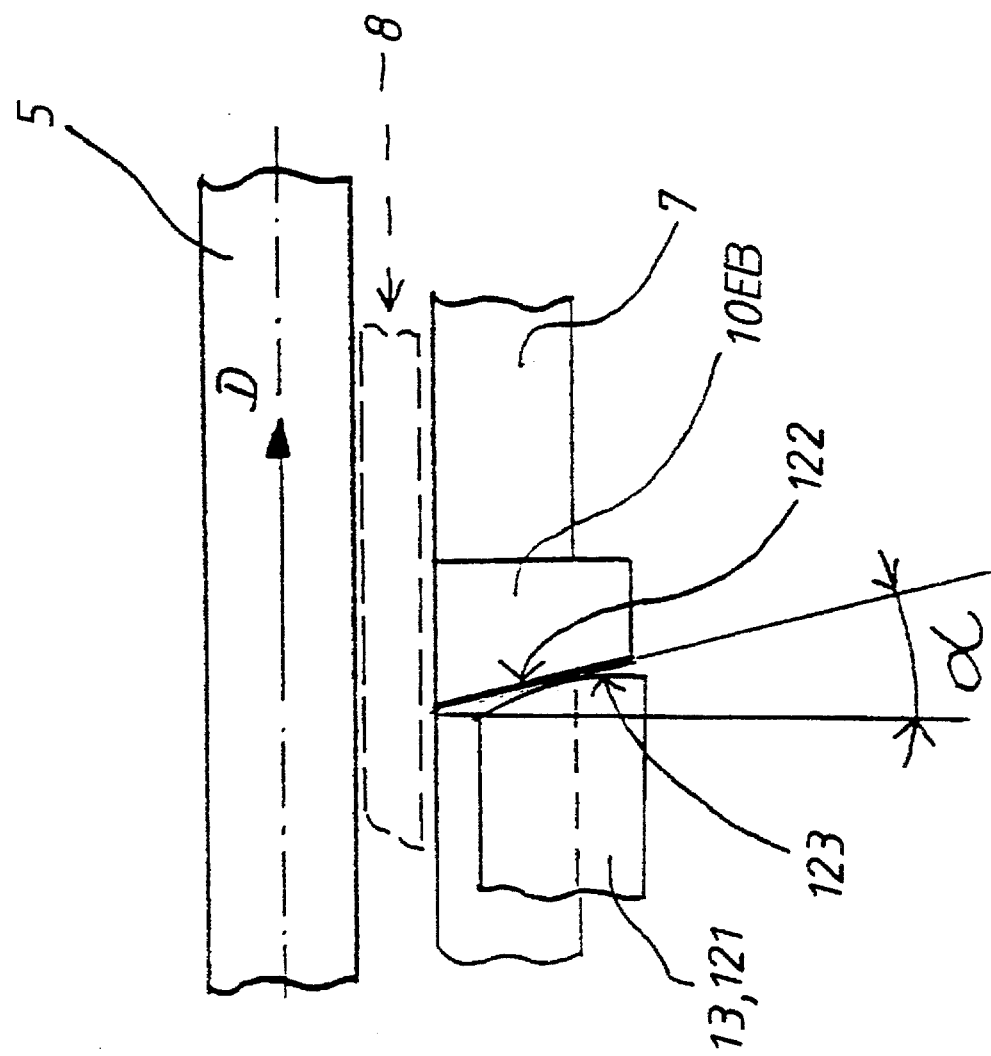

FIGS. 3a and 3b illustrate alternatives to the embodiment of FIG. 3.

Considering FIGS. 3a and 3b: A rotation protection configuration 119 at the bearing ridge 10EB of the brake bracket 7 has a support surface 122 which is at an angle α to the perpendicular to the brake disc, and thus is inclined against the preferred rotational direction D. The associated support surface 123 of a dog 121 on the pressure plate 13 is also inclined at this angle, so that the support surfaces 122, 123 are substantially parallel. In order to be able to influence the sliding action between the pressure plate 13 and the brake bracket 7 in the rotation protection configuration 119, the contour and the angle of one of the two support surfaces (122, 123) with respect to the other may be of any desired form, e.g. a rounded convex shape.

When the pressure plate 13 is slid axially toward the plane of the brake disc, the ramp formed by the two support surfaces (122, 123) produces a tangential countertorque in the rotation protection configuration 119, which further reduces the nonuniformity of tangential wear.

As mentioned at the beginning of the description of the drawings, the drawings and the associated descriptions are based on a preferred direction of rotation D. However, if, as often occurs, the brake is employed with changes of the rotational direction, particularly under frequent such changes, it may be advisable or even necessary to have duplicates of the described rotation prevention configurations, such that equivalent configurations are also active in the second rotational direction. In any event, an important consideration is that the brake shoes 8, 9 be buttressed only on one side (e.g. the A-side), and the brake caliper 1 and the pressure plate 13 be buttressed on the other side (e.g. the E-side).

Operation

When the brake is actuated, the B-side brake shoe 8 is slid over the bearing ridges 10EB, 10AB until the brake pad rests against brake disc 5, wherewith the tangential force which is produced urges the brake shoe 8 in the rotational direction D and presses it against the lateral bearing ridge 11AB. At the same time, the axial reaction force causes the brake caliper 1 to slide over the guide bolts 12, whereby the F-side brake pad on shoe 9 is applied against the brake disc 5 on the F-side. Here too, the brake shoe 9 is urged in the rotational direction, and is pressed laterally against the bearing ridge 11AF.

As the brake pressure increases and the tangential forces increase, the F-side caliper arm 3 tends increasingly to follow this movement, whereby it is moved to an inclined orientation with respect to the guide bolts 12. However, it is hindered in this by the fact that after closing the detent gap 17 the F-side caliper arm 3 in the region of the caliper bridge 4E is "drawingly" abutted via support surface 16 against support surface 15 of brake bracket arm 6EF. Consequently, an effective counteraction is provided to prevent the caliper adopting an inclined orientation accompanied by one-sided [i.e. nonuniform] loading of the brake shoe, and resulting inclined, nonuniform tangential wear.

Because the detent gap 17 is still present at the beginning of the braking process, there is not yet any friction between the support surfaces 15 and 16. Thus the actuating force acts solely to axially displace the caliper. In contrast, with the positive-engagement guide means according to the above-mentioned Ger. Pat. 2,750,337 C2, a higher actuating force is needed as early as this actuation phase, in order to overcome the frictional forces in sliding the caliper. This prior art arrangement would be particularly disadvantageous in the case of a brake equipped with a force-dependent adjusting device, because the adjustment means would be de-coupled by the increasing actuating force, and the adjusting step would be interrupted, even thought the air gap in the F-side brake pad would at that time still not be overcome. Furthermore, the detent gap of the present invention has the advantage that it compensates for unavoidable manufacturing tolerances.

Figure 4:
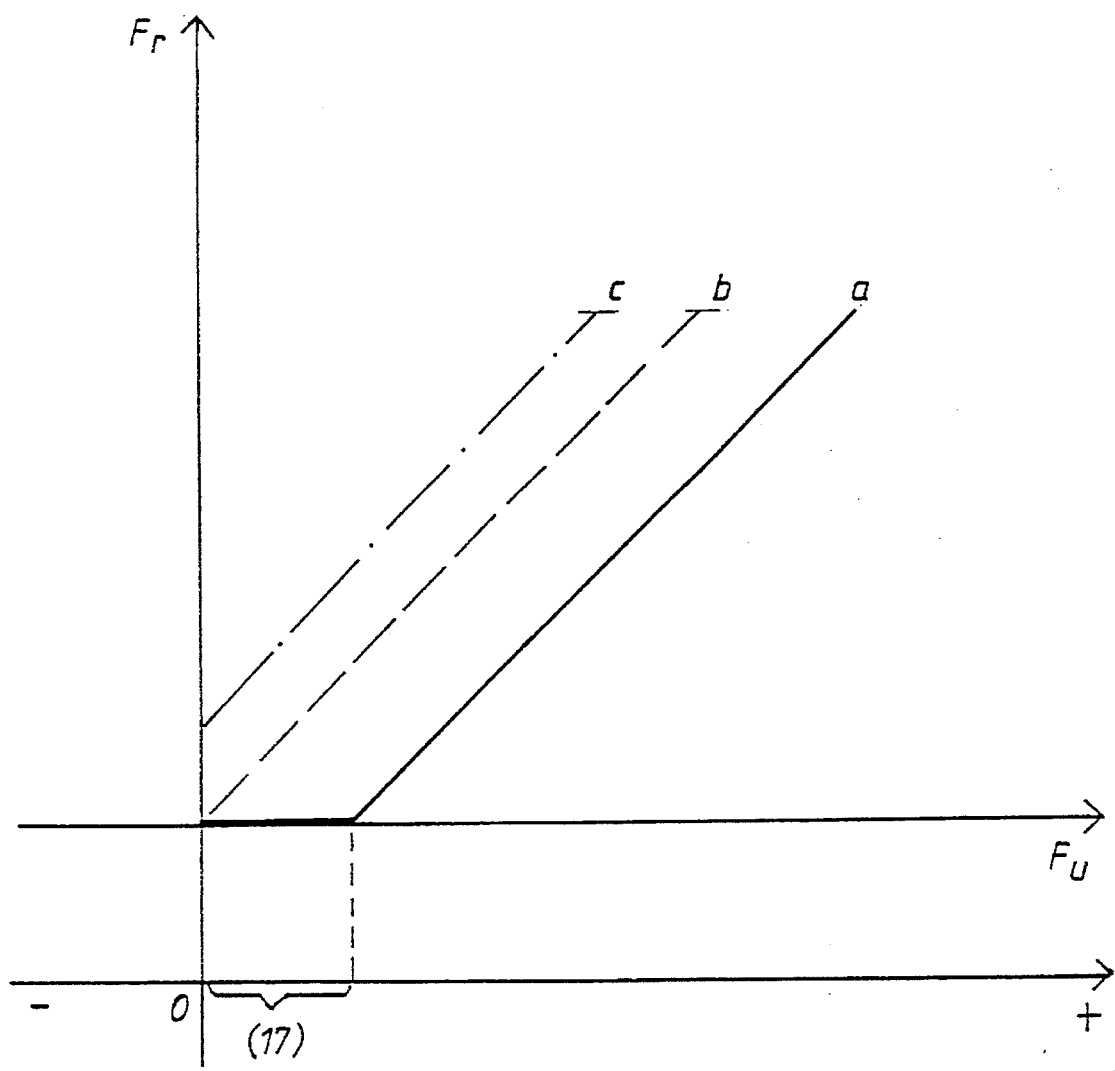
FIG. 4 is a graph showing the relationship between the friction force between abutting surfaces of the rotation prevention mechanisms and the tangential braking force.

FIG. 4 shows the actuating force required, as a function of the tangential force or the axial sliding movement of the caliper.

KEY to FIG. 4:

Ordinate=Friction force (Fr) between the support surfaces.

Top abscissa=Tangential force (Fu).

Bottom abscissa=Detent gap (+),

Curve (a) of FIG. 4 shows the aforesaid relation under the influence of the detent gap 17; and curve (b) shows the relationship when positive-engagement guide means of the type contemplated according to German Patent. 2,750,337 C2 are employed.

It may be seen from curve (b) that even at excursions at zero load on the brake shoe the braking forces needed to overcome the friction forces are substantially greater than is the case under the influence of the detent gap 17 (curve (a)). The friction forces further increase during the development of the tangential forces during the forceful excursion. Curve (c) represents the case of negative tolerances, e.g. resulting from manufacturing deviations.

The above-described advantages of the invention apply also in the case of the "drawn" pressure plate 13 when its support surface 23 abuts with increasing force against support surface 22. This embodiment acts in the nature of a rotation prevention configuration, so that the forceful axial guiding of the pressure plate also results in opposition to rotation of the brake shoe 8, in addition to uniform application of the pad so as to avoid inclined wear.

While only preferred embodiments of the invention have been described herein in detail, the invention is not limited thereby and modifications can be made within the scope of the attached claims.

We claim:

1. A disc brake comprising a brake bracket, a brake disc, an actuation-side brake shoe, an outer-rim-side brake shoe, a brake caliper axially slidably mounted on the brake bracket so as to be axially slidable with respect to the brake disc, the caliper having a rim-side caliper arm which extends over the brake disc, first rotation prevention means for preventing the outer-rim-side brake shoe from rotating with the brake disc and thereby bracing the outer-rim-side brake shoe against the brake bracket, second rotation prevention means for preventing the actuation-side brake shoe from rotating with the brake disc and thereby bracing the actuation-side brake shoe against the brake bracket, and third rotation prevention means for preventing the rim-side caliper arm from rotating with the brake disc and thereby bracing the rim-side caliper arm against the brake bracket, wherein the outer-rim-side brake shoe and the rim-side caliper arm are slidably disposed with respect to each other in a plane parallel to the brake disc, wherein said first rotation prevention means is located to brace the outer-rim-side brake shoe against the brake bracket on a disc-outgoing side of the brake bracket, and wherein said third rotation prevention means is located to brace the rim-side caliper arm against the brake bracket on a disc-incoming side of the brake bracket.

2. A disc brake according to claim 1 wherein the second rotation prevention means is located for bracing the actuation-side brake shoe against the brake bracket on the disc-outgoing side of the brake bracket.

3. A disc brake according to claim 1 which includes a pressure plate for pressing the actuation-side brake shoe against the brake disc, and fourth rotation prevention means for preventing the pressure plate from rotating with the brake disc and for bracing the pressure plate against the brake bracket on the disc-incoming side of the brake bracket.

4. A disc brake according to claim 3 wherein the pressure plate is slidable with respect to the actuation-side brake shoe, in a plane parallel to the brake disc.

5. A disc brake according to claim 3 wherein the pressure plate and the actuation-side brake shoe are relatively fixed in a plane parallel to the brake disc.

6. A disc brake according to claim 1 wherein at least one of said rotation prevention means has a detent gap.

7. A disc brake according to claim 1 wherein at least one of said rotation prevention means is disposed to provide a moment arm of an abutting force of said at least one of said rotation prevention means against the brake bracket with respect to a rotational axis of the disc which moment arm is as short as possible within the dimensions of the brake.

8. A disc brake according to claim 1 wherein the third rotation prevention means is disposed in a recess in the rim-side caliper arm said recess having an extent in an axial direction with respect to the brake disc to allow a sliding movement of the brake caliper when the brake is actuated.

9. A disc brake according to claim 8 wherein said recess has stress-relieving corner formations.

10. A disc brake according to claim 1 which includes elongated guide means to hold the brake caliper on the brake bracket for sliding movement of the caliper on said guide means.

11. A disc brake comprising a brake bracket, a brake disc, a brake shoe, a first rotation preventing means for preventing the brake shoe from rotating with the brake disc and for bracing the brake shoe against the brake bracket, a pressure plate for pressing the brake shoe against the brake disc, second rotation preventing means for preventing rotation of the pressure plate and for bracing the pressure plate against the brake bracket, wherein the brake shoe and the pressure plate are slidable with respect to each other in a plane parallel to the brake disc, wherein the first rotation preventing means is located to brace said brake shoe against the brake bracket on a disc-outgoing side of the brake bracket, and wherein the second rotation preventing means is located for bracing the pressure plate against the brake bracket on a disc-incoming side of the brake bracket.

12. A disc brake according to claim 11 wherein at least one of the first and second rotation preventing means includes a support surface which is at least in part oriented at an incline to a perpendicular to the brake disc, and is inclined oppositely to a preferred disc rotation direction.

13. A disc brake according to claim 12 wherein the support surface has a spherically convex shape.

14. A disc brake according to claim 11 which includes a third rotation preventing means for a second outer wheel rim side brake shoe for bracing said second shoe against the brake bracket on the disc-outgoing side of the brake bracket.

\* \* \* \* \*